US011905925B2

(12) United States Patent
Schroer (10) Patent No.: US 11,905,925 B2
(45) Date of Patent: Feb. 20, 2024

(54) FLANGE ARRANGEMENT, FLANGED HUB, STOP MEMBER, GEAR UNIT, ELECTRIC MOTOR, WIND TURBINE AND INDUSTRIAL APPLICATION

(71) Applicant: Flender GmbH, Bocholt (DE)

(72) Inventor: Dirk Schroer, Rhede (DE)

(73) Assignee: Flender GmbH, Bocholt (DE)

( * ) Notice: Subject to any disclaimer, the term of this patent is extended or adjusted under 35 U.S.C. 154(b) by 591 days.

(21) Appl. No.: 17/011,701

(22) Filed: Sep. 3, 2020

(65) Prior Publication Data

US 2021/0071646 A1 Mar. 11, 2021

(30) Foreign Application Priority Data

Sep. 6, 2019 (EP) ..................... 19195930

(51) Int. Cl.
| | | |
|---|---|---|
| F03D 15/10 | (2016.01) | |
| F03D 9/25 | (2016.01) | |
| F16D 1/08 | (2006.01) | |
| F16D 1/108 | (2006.01) | |
| F16D 1/092 | (2006.01) | |
| F01D 25/24 | (2006.01) | |

(52) U.S. Cl.
CPC ........... *F03D 15/10* (2016.05); *F01D 25/243* (2013.01); *F03D 9/25* (2016.05); *F16D 1/0876* (2013.01); *F16D 1/108* (2013.01); *F05B 2240/60* (2013.01); *F05B 2260/40311* (2013.01); *F16B 2200/506* (2018.08); *F16D 1/092* (2013.01)

(58) Field of Classification Search
CPC ...... F03D 9/25; F03D 15/00–20; F03D 80/88; F16D 1/06; F16D 1/076; F16D 1/08; F16D 1/0876; F16D 1/092; F16D 1/108; Y10T 403/1641; H02P 9/06; H02P 29/0027
See application file for complete search history.

(56) References Cited

U.S. PATENT DOCUMENTS

| | | | | |
|---|---|---|---|---|
| 2,381,697 | A * | 8/1945 | Shepard | F16D 1/096 403/16 |
| 3,957,381 | A * | 5/1976 | Schafer | F16D 1/093 416/244 R |
| 4,268,185 | A * | 5/1981 | Mullenberg | F16D 1/093 403/370 |
| 4,274,755 | A | 6/1981 | Bernasconi | |
| 2019/0048938 | A1 * | 2/2019 | Demtröder | F03D 9/25 |

(Continued)

FOREIGN PATENT DOCUMENTS

| | | |
|---|---|---|
| AT | 506 645 A2 | 10/2009 |
| CN | 202056211 | 11/2011 |

(Continued)

OTHER PUBLICATIONS

Chinese Search Report dated Aug. 15, 2022 with respect to counterpart Chinese patent application 202010922838.1.

(Continued)

*Primary Examiner* — Christopher R Legendre
(74) *Attorney, Agent, or Firm* — Henry M. Feiereisen LLC (57) ABSTRACT

A flange arrangement includes a power shaft, a flanged hub connected detachably to the power shaft, and a stop member configured to detachably hold the flanged hub on the power shaft and to exert a disassembly force on the flanged hub so as to be able to rotate about a rotation axis of the power shaft.

14 Claims, 5 Drawing Sheets

(56) References Cited

U.S. PATENT DOCUMENTS

2021/0071646 A1* 3/2021 Schroer ............... F16D 1/0876
2021/0079995 A1 3/2021 Meis

FOREIGN PATENT DOCUMENTS

| | | |
|---|---|---|
| CN | 102483096 | 5/2012 |
| CN | 209309157 | 8/2019 |
| DE | 10 2009 019 435 A1 | 11/2009 |
| DE | 10 2013 200 911 A1 | 8/2013 |
| EP | 3 502 516 | 6/2019 |
| WO | WO 2014/121894 | 8/2014 |
| WO | WO 2017-148481 A1 | 9/2017 |

OTHER PUBLICATIONS

Translation of Chinese Search Report dated Aug. 15, 2022 with respect to counterpart Chinese patent application 202010922838.1.
Flender GMBH: Broschüre "Pure Energie—effizient und zuverlässig—Planurex 3: Die Antriebslösung für Ihre Zuckerrohrmühle mit Individualantrieb", Artikelnummer PDMD-B10121-00, pp. 1-16.

* cited by examiner

FLANGE ARRANGEMENT, FLANGED HUB, STOP MEMBER, GEAR UNIT, ELECTRIC MOTOR, WIND TURBINE AND INDUSTRIAL APPLICATION

CROSS-REFERENCES TO RELATED APPLICATIONS

This application claims the priority of European Patent Application, Serial No. 19195930.3, filed. Sep. 6, 2019 pursuant to 35 U.S.C. 119(a)-(d), the disclosure of which is incorporated herein by reference in its entirety as if fully set forth herein.

BACKGROUND OF THE INVENTION

The present invention relates to a flange arrangement, a corresponding flanged hub and a corresponding stop member. The invention also relates to a gear unit and an electric motor, which have a corresponding flange connection. The invention likewise relates to a drive chain of a wind turbine, a corresponding wind turbine and an industrial application which are equipped with a corresponding flange arrangement.

The following discussion of related art is provided to assist the reader in understanding the advantages of the invention, and is not to be construed as an admission that this related art is prior art to this invention.

Flange arrangements are used in different technical fields for transmitting a drive power from a shaft via a flange to a machine. In many applications, there is a demand to transmit ever increasing drive powers. Furthermore, increased demands are placed on the maintenance and repair friendliness of such connections, while yet establishing connections of this type quickly and cost-efficiently.

It would be desirable and advantageous to address these demands and to obviate other prior art shortcomings.

SUMMARY OF THE INVENTION

According to one aspect of the present invention, a flange arrangement includes a power shaft, a flanged hub connected detachably to the power shaft, and a stop member configured to detachably hold the flanged hub on the power shaft and to exert a disassembly force on the flanged hub so as to be able to rotate about a rotation axis of the power shaft.

The power shaft can be embodied as a drive shaft or output shaft. Detachable fasteners may be provided to detachably fasten the stop member to the flanged hub. The flanged hub can be coupled to the power shaft in a torque-transmitting manner. In an assembled state, the flanged hub is detachably connected to the power shaft, with the stop member holding the flanged hub on the power shaft in a form-fit manner and thus exerting a holding force on the flanged hub. In accordance with the present invention, the stop member is configured to exert a disassembly force which is essentially opposed to the holding force. For this purpose, the stop member is rotatable about the rotation axis of the power shaft. The stop member is thus rotatable between a holding position, in which the holding force can be exerted, and a disassembly position, in which the disassembly force can be exerted. In this regard the holding force can only be exerted in the holding position and the disassembly force can only be exerted in the disassembly position.

The stop member can therefore be used both in the case of assembly and also in the case of disassembly for exerting the required forces, i.e. to exert the holding force and the disassembly force. In an assembled state of the flange arrangement, the stop member is also accessible so that assembly and disassembly can be carried out easily. In particular in the case of disassembly of the flange arrangement, the requirement for auxiliary devices is reduced so that a flange arrangement according to the present invention thus offers the possibility of a cost-efficient and rapid disassembly and is not only compact but enables a space-saving assembly and disassembly.

According to another advantageous feature of the present invention, the disassembly force exerted by the stop member can be aligned axially, i.e. along the rotation axis of the power shaft. In this way, the disassembly force is aligned so as to remove the flange hub from the power shaft. As a result of the opposing alignment of the disassembly force and the holding force, the stop member only exerts an axial force. There is thus no need for the presence of complex stop members that exert forces in a peripheral direction of the power shaft and the flanged hub. The stop member can be embodied as a holding ring which can be manufactured quickly and economically. Furthermore, a disassembly force, which is aligned along the rotation axis of the power shaft, simplifies disassembly, since during disassembly the movement of the flanged hub is essentially free of changes in direction. No additional surfaces are needed for imprinting and canting of components. Additional mechanical stress on the flanged hub or on the power shaft is consequently avoided. As a result, assembly or disassembly of a flange arrangement according to the present invention can be implemented with a simple tool since no increased forces are to be applied in order to release correspondingly canted components.

According to another advantageous feature of the present invention, the stop member can have a first front face in facing relation to the power shaft so as to exert a holding force on the flanged hub, and a second front face which faces away from the power shaft and exerts the disassembly force. The side of the stop member which faces away from the front face relates hereby to the side which points in the direction of a free end of the power shaft. Accordingly, a front face of the stop member is used to provide the holding force for the flanged hub by exerting a supporting force, for instance, and another front face is used to provide the disassembly force by exerting a supporting force, for instance. Exertion of the holding force by means of a front face of the stop member allows a statically overdetermined state between the flanged hub and the stop member to be avoided, which can develop for instance with complicated screw joints. Overdetermined states of this type are prone to failure in response to variable loads. This technical disadvantage is therefore avoided by a flange arrangement according to the present invention. Therefore, in the assembled state, play between the flanged hub and the stop member can be reduced at the same time. Exertion of the disassembly force and the holding force can therefore only take place through regions of the respective front face. As a result, a function separation is realized overall on the surfaces of the stop member. As a result, the front faces or their corresponding regions and/or corresponding contact regions of the flanged hub can be easily adjusted. For instance, surfaces can be roughened in order to counteract the flanged hub from slipping with respect to the stop member in the event of disassembly.

According to another advantageous feature of the present invention, the stop member can include a support segment extending radially outward. The support segment can be embodied as a ring segment on a stop member that can be embodied as a holding ring, for instance. As an alternative, the flanged hub can include a support segment which extends radially inward. This support segment can be formed on the flanged hub, for instance. The segment shape of the support segments enables clearance regions to be embodied there between so as to allow the support segments of the flanged hub and the stop member to mutually pass in a suitable rotational position. To this end, a number of support segments can also be embodied on the flanged hub and/or on the stop member. Support segments of this type offer adequate play in order to allow the stop member to pass through the flanged hub. To this end the stop member can have cast contours, i.e. rough surfaces.

According to another advantageous feature of the present invention, the stop member can be configured for rotation between a holding position, in which the stop member exerts the holding force, and a disassembly position in which the stop member exerts the disassembly force. A corresponding rotation is carried out here about the rotation axis of the power shaft. The disassembly position is established when the support segments of the stop member and the flanged hub oppose one another in the axial direction, so that a supporting force can be exerted onto a support segment of the flanged hub by means of a support segment of the stop member. The term "holding position" is to be understood to relate to any positioning of the stop member, in which the stop member can be mounted in the flange arrangement. The stop member has a reduced weight and is accordingly easy to handle. Rotation of the stop member is easy to realize, so that a disassembly process is further simplified. A simple rotation can also be ensured by providing sufficient axial play for the stop member in the region of the inner side of the flanged hub.

According to another advantageous feature of the present invention, the flanged hub can have an involute spline in mesh with an involute spline on the power shaft so as to effect transmission of a rotation there between. An involute spline can easily be produced and provides in the peripheral direction an adjustable play, by means of which the flanged hub can in turn be easily connected to a mechanical application. In particular, by retaining a play in the peripheral direction between the flanged hub and the stop member, a flange arrangement according to the present invention therefore allows the play in the axial direction to be reduced there between.

According to another advantageous feature of the present invention, the flanged hub and the power shaft can be connected via a taper seat, a cylindrical press fit, or a shaft-hub connection with key connection. In this way, a flange arrangement according to the present invention can be best suited to a broad range of applications.

According to another advantageous feature of the present invention, a fastener can be received in the stop member to exert the disassembly force onto the flanged hub. The fastener can be detachable, e.g. a screw, and may be guided via a thread through the stop member and abut a front face of the power shaft. When the stop member assumes a disassembly position, a supporting force exerted onto the power shaft by a fastener is transmitted to the stop member which abuts the flanged hub. As a result, on the basis of the fastener, the disassembly force acting on the flanged hub is caused by way of the stop member. The flanged hub can be removed from the power shaft in this way. Depending on the requirement, e.g. the weight of the flanged hub, a number of fasteners can also be arranged in the stop member. For instance, a number of bores with suitable transmission threads for corresponding screws can be embodied in the stop member. Fasteners of this type can be embodied as standardized components which offer high availability and cost-effectiveness.

According to another advantageous feature of the present invention, the power shaft can be embodied as a solid shaft or as a hollow shaft. A flange arrangement according to the present invention is suitable both for solid shafts and also hollow shafts and allows application to power shafts of different power categories. The higher the power category and the larger the flanged hub of the flange arrangement, the more significant therefore the afore-described advantages. A flange arrangement according to the present invention only requires a minimum front face on the power shaft, to which the supporting force is to be introduced in order to produce the disassembly force. A flange arrangement according to the present invention can therefore also be used in a hollow shaft with relatively thin walls. The design of a hollow shaft is not determined by the requirement of a large support surface. This allows the mechanical performance of a hollow shaft to be better utilized.

According to another aspect of the present invention, a flanged hub can include a cylinder section having an involute spline, a flange section adjoining the cylinder section, and a support collar configured to axially support the flanged hub on a power shaft as the involute spline of the cylinder section meshes an involute spline of the power shaft. The flange section of the flanged hub can be connected to a machine flange and can be connected to the cylinder section, for instance molded hereto. The cylinder section can be slid onto a power shaft. The cylinder section is provided with an involute spline, which is embodied on an inner side of the cylinder section. The support collar supports the flanged hub axially on the power shaft. The support collar can be a peripheral projection on an inner side of the flanged hub, for instance. Alternatively, the support collar can also include a number of projections at a distance from one another in the peripheral direction. The flanged hub is embodied in accordance with the invention so that it can be used as a flanged hub in a flange arrangement according to the present invention. The flanged hub has a relatively simple geometry, is correspondingly cost-effective to manufacture and allows rapid disassembly of such a flange arrangement.

According to yet another aspect of the present invention, a stop member includes an annular body having a plurality of cut-outs, and fasteners received in the cut-outs and interacting with a power shaft. For this purpose, transmission threads can be embodied in the cut-outs, for instance, and the detachable fasteners can be embodied as corresponding screws. The stop member belongs to a flange arrangement according to the present invention. As a result of also being suited to exerting a disassembly force, a stop member of this type offers a reinforced function integration.

According to still another aspect of the present invention, a gear unit includes a flange arrangement which includes a power shaft embodied as a drive shaft or as an output shaft, a flanged hub connected detachably to the power shaft and including a cylinder section having an involute spline, a flange section adjoining the cylinder section, and a support collar configured to axially support the flanged hub on the power shaft as the involute spline of the cylinder section meshes an involute spline of the power shaft, and a stop member configured to detachably hold the flanged hub on the power shaft and to exert a disassembly force on the flanged hub so as to be able to rotate about a rotation axis of the power shaft. The gear unit can be embodied, for instance, as a planetary gear unit, spur gear unit, bevel gear unit, worm gear unit or hypoid gear unit. The power shaft of the flange arrangement transmits a drive power to a machine. Integration of a flange arrangement according to the present invention in a gear unit is especially advantageous in order to transmit frequently encountered high drive powers. Maintenance of the gear unit is in particular simplified in this way. As a result, downtimes can be reduced in an industrial application or a wind turbine, for instance.

According to still another aspect of the present invention, an electric motor includes a flange arrangement which includes a power shaft embodied as an output shaft, a flanged hub connected detachably to the power shaft, and a stop member configured to detachably hold the flanged hub on the power shaft and to exert a disassembly force on the flanged hub so as to be able to rotate about a rotation axis of the power shaft. The electric motor has an output shaft, by way of which the drive power can be output. The output shaft is used as a power shaft which is provided with a flanged hub. The flanged hub and the power shaft belong here to a flange arrangement according to the present invention. The afore-described advantages are also applicable in such an electric motor.

According to still another aspect of the present invention, a drive train for a wind turbine includes a generator, a gear unit connected in a torque-transmitting manner to a generator, a rotor shaft connected in a torque-transmitting manner to the gear unit, and a connection provided between the gear unit and the generator and/or the rotor shaft and including a flange arrangement according to the present invention. At least one of the connections between the gear unit and the generator and/or the rotor shaft is embodied here as a flange arrangement according to the present invention. Drive trains of wind turbines typically have a size which requires extensive maintenance with a powerful lifting gear etc. Accordingly, the integration of a flange arrangement according to the present invention offers a particularly advantageous simplification in terms of handling drive trains during their manufacture and repair.

According to still another aspect of the present invention, a wind turbine includes a nacelle, a rotor attached to the nacelle, and a drive train received in the nacelle and including a generator, a gear unit connected in a torque-transmitting manner to a generator, a rotor shaft connected in a torque-transmitting manner to the gear unit, and a connection provided between the gear unit and the generator and/or the rotor shaft and including a flange arrangement according to the present invention. Integration of a flange arrangement according to the present invention in a wind turbine allows for a simple and space-saving assembly and disassembly. On account of the minimal free space in a nacelle, this allows for simpler and thus quicker maintenance of the wind turbine.

According to still another aspect of the present invention, an industrial application includes a drive unit, a gear unit, an output unit connected to the gear unit in a torque-transmitting manner, and a connection provided between the gear unit and the drive unit and/or the output unit and including a flange arrangement according to the present invention. The drive unit can be embodied as an electric motor, combustion motor or hydraulic motor, for instance. The drive unit makes a drive power available, which is forwarded to a gear unit via a torque-transmitting connection. The gear unit is in turn connected to an output unit in a torque-transmitting manner, for which the drive power is made available. The output unit can be embodied as a mechanical application, for instance as a mill, vertical mill, sugar mill, cement mill, rock breaker, conveyor belt, pump, roller press, slat conveyor, tube mill, rotary kiln, slewing gear, agitator, lifting apparatus, compactor or crusher. The connection between the gear unit and the drive unit and/or the output unit is established here by a flange arrangement according to the present invention. For instance, with maintenance-intensive mechanical applications, in particular sugar mills, the maintenance of the gear unit can be simplified and the cost-effectiveness of the industrial application can thus be increased. With numerous applications, in particular with sugar mills, the assembly and disassembly with the claimed flange arrangement requires no additional assembly setting values.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
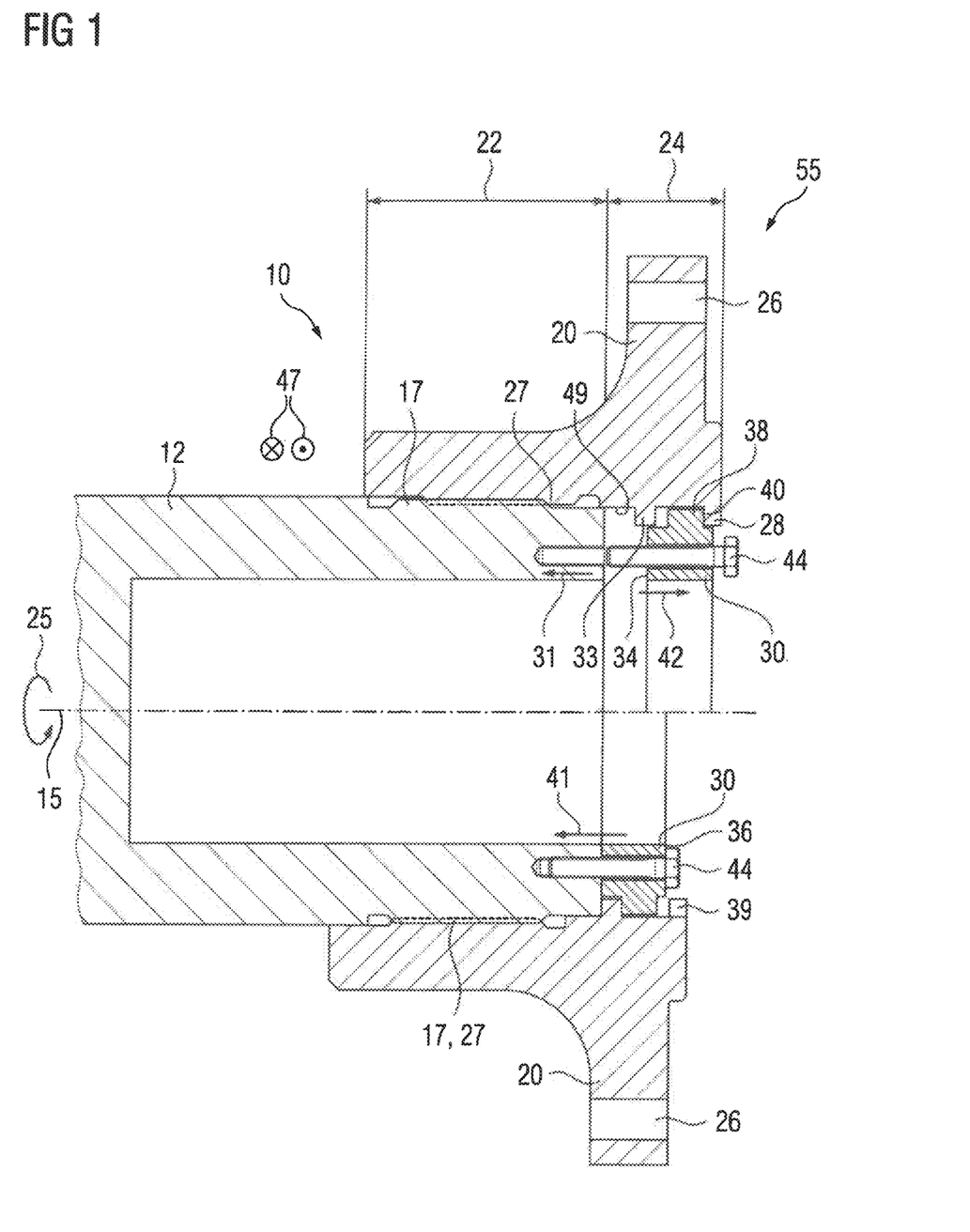
FIG. 1 is a sectional view of two half sections of a first embodiment of a flange arrangement according to the present invention, depicting the flange arrangement in the upper half section in a disassembly position and in the lower half section in a holding position.

Turning now to the drawing, and in particular to FIG. 1, there is shown a sectional view of two half sections of a first embodiment of a flange arrangement according to the present invention, generally designated by reference numeral 10. The flange arrangement 10 includes a flange hub 20 and a power shaft 12, which interacts with the flanged hub 20 and is rotatable about a rotation axis 15. In the upper half section of FIG. 1, the flange arrangement 10 is shown in a disassembly position and in the lower half section in a holding position.

The power shaft 12 may constitute a drive shaft or output shaft of a gear unit 50 (FIGS. 5 and 6) or electric motor, not shown in further detail in FIG. 1, and is embodied as a hollow shaft. The power shaft 12 is provided with an involute spline 17, which meshes with a corresponding involute spline 27 on a cylinder section 22 of the flanged hub 20. A drive power, indicated by arrow 25, is transmitted from the power shaft 12 to the flanged hub 20 via the meshing involute splines 17, 27. Furthermore, a toothing backlash is present between the flanged hub 20 and the power shaft 12 along a peripheral direction, symbolically indicated by reference numeral 47 and extending in FIG. 1 in or out of the drawing plane. The toothing backlash makes it easier to push the flanged hub 20 onto the power shaft 12. On a peripheral inner surface 49, the flanged hub 20 has a support collar 33, which is also embodied peripherally.

Figure 4:
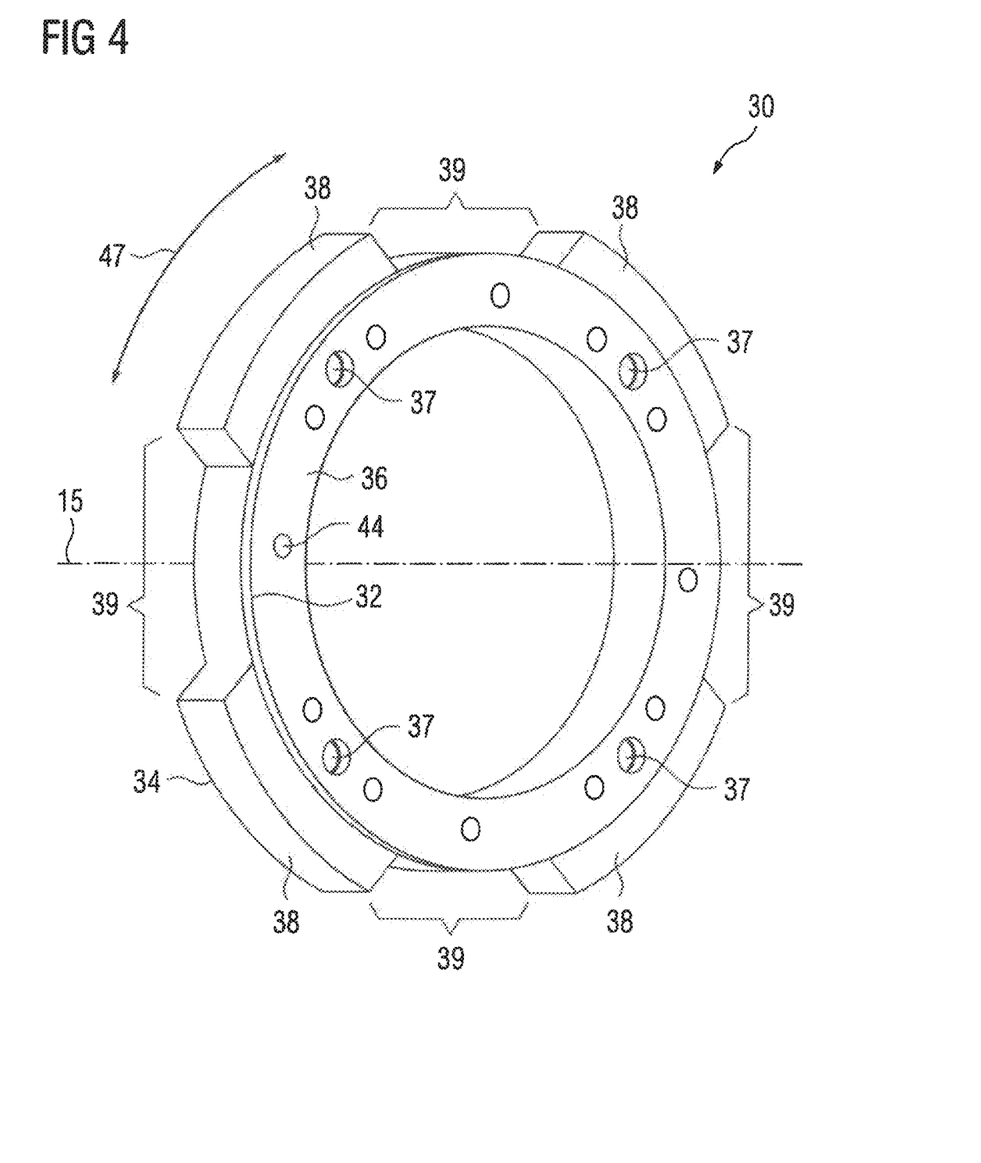
FIG. 4 is an oblique view of a stop member for use in the flange arrangement of FIG. 1 or 2.

The flange arrangement 10 includes a stop member 30, which is embodied essentially as a holding ring, i.e. has a ring section (FIG. 4). The stop member 30 is formed with support segments 38, between which a clearance region 39 is respectively formed. The support segments 38 of the stop member 30 are embodied to exert a holding force, indicated by arrow 41, onto the support collar 33 for axial support in an assembled state, i.e. the holding position. The support segments 38 form part of a front face 34 of the stop member 30 in facing relation to the power shaft 12. Fasteners 44, e.g. screws by way of example, are received in the stop member 30. The fasteners 44 interact with the power shaft 12 so as to exert the holding force 41. The holding force 41 is essentially exerted in a planar manner by means of the support segments 38 and the support collar 33, as a result of which statically overdetermined bearings are avoided.

The flanged hub 20 includes a flange section 24 which adjoins the cylinder section 22 and has flange bores 26 via which the flanged hub 20 can be connected to a machine 55, not shown in more detail, in a torque-transmitting manner. Formed on the inner side 49 of the flanged hub 20 are support segments 28 which extend radially outward with respect to the rotation axis 15. Clearance regions 29 are located between the support segments 28 of the flanged hub 20, essentially similarly to the support segments 38 of the stop member 30. The support segments 28 of the flanged hub 20 belong to a front face 36 of the stop member 30 facing away from the power shaft 12 on a side shown to the right in FIG. 1. The stop member 30 can be rotated about the rotation axis 15 such that the support segments 28 of the flanged hub 20 oppose the support segments 38 of the power shaft 12, thereby establishing the disassembly position for the stop member 30. The fasteners 44, received in the stop member 30, are able to exert a supporting force, indicated by arrow 31, onto the power shaft 12, so that the stop member 30 is pressed in a direction of the front face 36 which faces away from the power shaft 12. As a result of the opposing support segments 28, 38 on the stop member 30 and the flanged hub 20, a disassembly force, indicated by arrow 42, is applied upon the flanged hub 20, so that the flanged hub 20 is removed. The stop member 30 thus combines two functions, i.e. as a holding member in the assembled state and as an auxiliary disassembly member of the flange arrangement 10.

Figure 2:
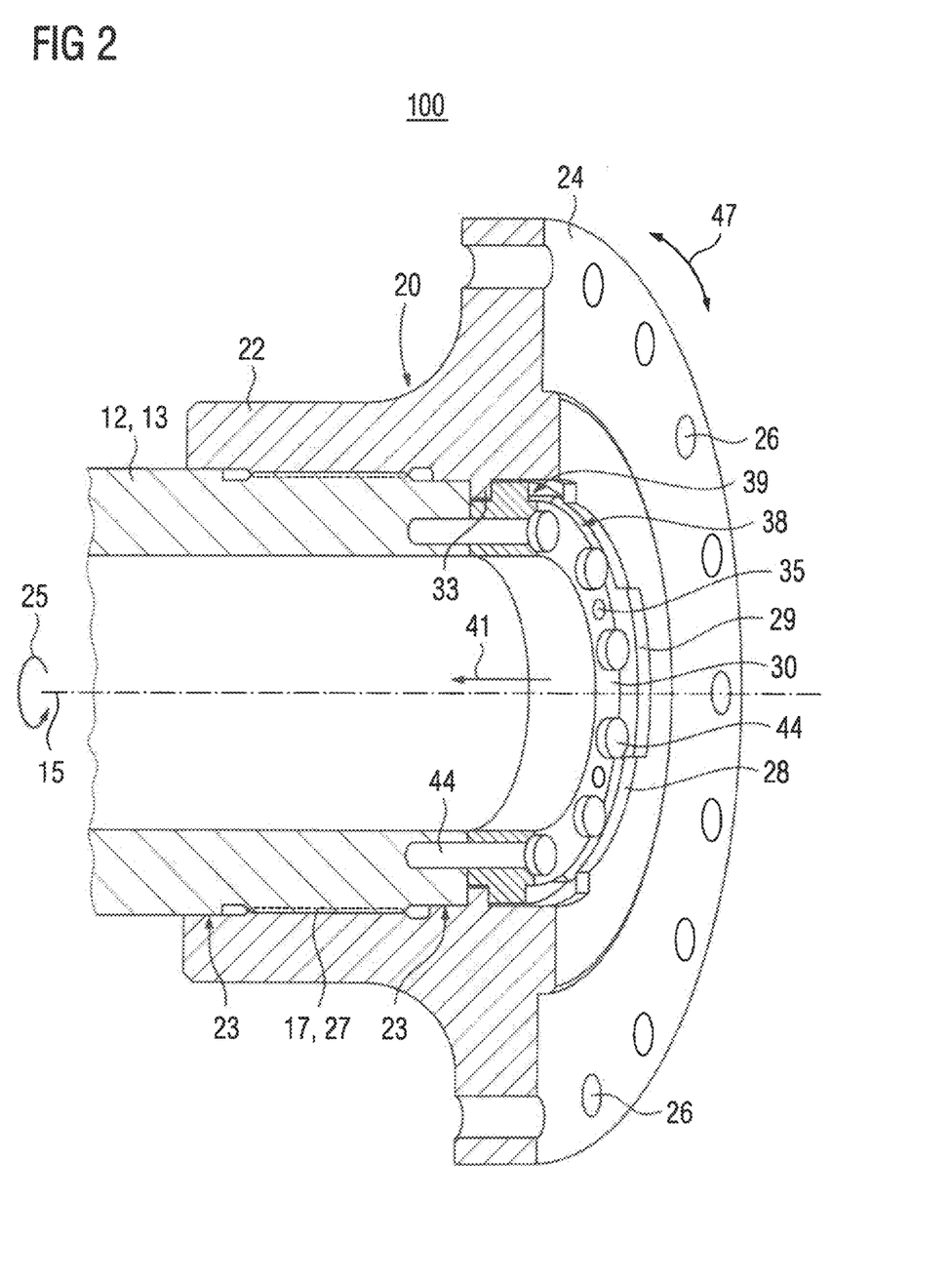
FIG. 2 is a longitudinal section of a second embodiment of a flange arrangement according to the present invention, depicting in an upper half the flange arrangement in a disassembly position.

FIG. 2 is a longitudinal section of a second embodiment of a flange arrangement according to the present invention, generally designated by reference numeral 100. Parts corresponding with those in FIG. 1 are denoted by identical reference numerals. The flange arrangement 100 includes a power shaft 12, which forms part of a gear unit 50 or electric motor, not shown in more detail. The power shaft 12 is embodied as a hollow shaft and is rotatable about a rotation axis 15. A flanged hub 20 is arranged on the power shaft 12 and includes a cylinder section 22 formed with an involute spline 27 for engagement in an involute spline 17 on the power shaft 12 and thereby transmits a drive power, indicated by arrow 25. A rotation takes hereby place in a peripheral direction, indicated by double arrow 47. As a result of the involute splines 17, 27, a play exists between the flanged hub 20 and the power shaft 12 in the peripheral direction 47. Adjoining the cylinder section 22 is a flange section 24 which is formed with a plurality of flange bores 26. The drive power 25 can be transmitted to a machine 55, not shown in more detail, by means of the flange section 24. The flanged hub 20 is further provided with a centering seat 23 to align the flanged hub 20 on the power shaft 12. A peripheral support collar 33, which abuts the power shaft 12, is embodied on an inner side of the flanged hub 20.

The flange arrangement 100 includes a stop member 30, which is embodied essentially as a holding ring. Received in the stop member 30 are fasteners 44, e.g. screws, via which the stop member 30 exerts a holding force, indicated by arrow 41, onto the support collar 33. The flanged hub 20 is herewith pressed by the holding force 41 axially against the power shaft 12. Support segments 38 of the stop member 30 project radially outward and rest in an essentially planar manner on the power shaft 12, thereby eliminating the need for a statically overdetermined bearing. When releasing the fasteners 44, the stop member 30 can be rotated about the rotation axis 15. As a result, the support segments 38 of the stop member 30 can be rotated relative to support segments 28 of the flanged hub 20, as shown in FIG. 2. In this case, a disassembly force can be exerted onto the flanged hub 20 by the stop member 30, thereby establishing a disassembly position, shown in FIG. 2. Alternatively, the stop member 30 can be rotated into a holding position, in which the support segments 38 of the stop member 30 oppose clearance regions 29 between the support segments 28 of the flanged hub 20 and vice versa. When assuming the holding position, the stop member 30 can be assembled and is capable to exert the holding force 41 onto the support collar 33.

Figure 3:
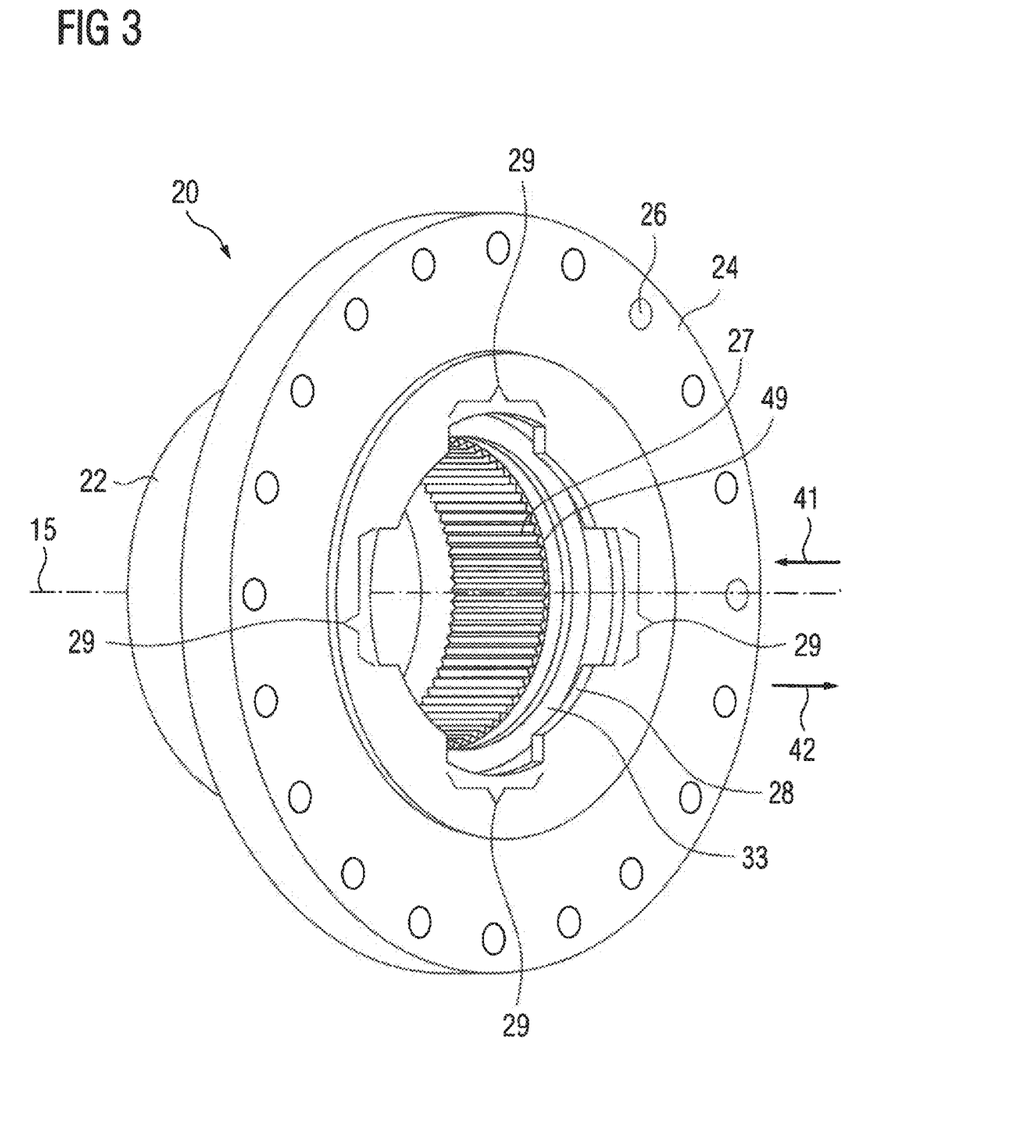
FIG. 3 is an oblique view of a flanged hub for use in the flange arrangement of FIG. 1 or 2.

Referring now to FIG. 3, there is shown an oblique view of a flanged hub 20 for use in the flange arrangement 10 or 100. The flanged hub 20 has a cylinder section 22 and a flange section 24 which adjoins the cylinder section 22 and includes flange bores 26. An involute spline 27 is embodied on an inner side 49 of the flanged hub 20 and meshes with a corresponding involute spline on a power shaft, not shown in FIG. 3. The flanged hub 20 is able to transmit via the involute spline 27 a drive power when rotated about the rotation axis. FIG. 3 further shows on the inner side 49 of the flanged hub 20 the provision of the peripheral support collar 33 via which holding force 41 can be exerted onto the flanged hub 20. The flange hub 20 further includes support segments 28 which in relation to the rotation axis 15 extend radially inward and have an essentially ring segment shape. The support segments 28 are distanced from one another by clearance regions 29. The support segments 28 are capable of receiving disassembly force 42, by means of which a removal of the flanged hub 20 from the power shaft, not shown in more detail, can be enabled or at least assisted.

FIG. 4 is an oblique view of a stop member 30 for use in the flange arrangement 10 or 100. The stop member 30 can be used in combination with a flanged hub 20 according to FIG. 3. The stop member 30 is embodied as a holding ring and includes a ring segment 32. Support segments 38 are formed on the ring segment 32 essentially at a same angle indexing. The support segments 38 are essentially embodied to be ring segment-shaped and project radially outward with respect to rotation axis 15. The support segments 38 are distanced from one another in the peripheral direction 47, with clearance regions 39 extending between the support segments 38. Furthermore, the stop member 30 has two front faces 34, 36, with front face 34 facing the power shaft (not shown in FIG. 4) in an assembled state and the opposite front face 36 facing away from the power shaft and thus pointing in a direction of its free end. The support segments 38 also form with their respective sides part of the corresponding front faces 34, 36. Furthermore, the stop member 30 is formed with bores for receiving fasteners, not shown in more detail, and bores with transmission threads 37.

Figure 5:
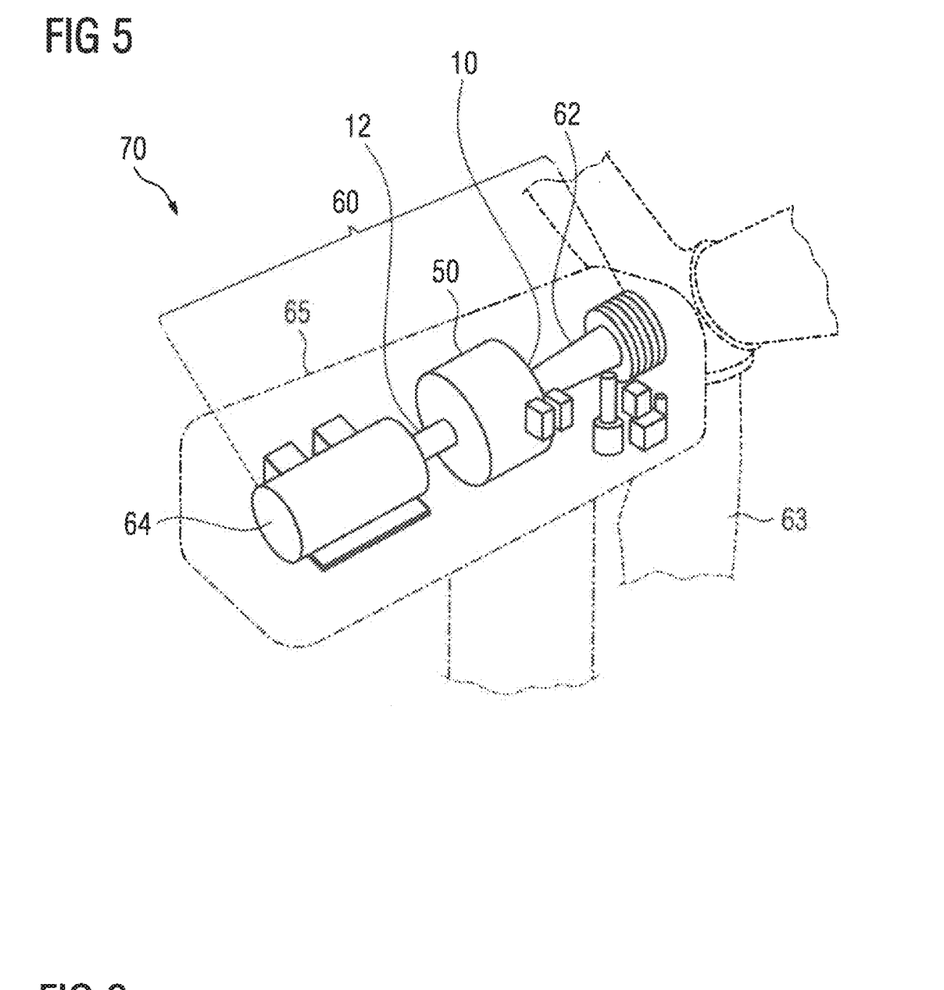
FIG. 5 is a schematic illustration of a wind turbine having incorporated a flange arrangement according to the present invention.

Turning now to FIG. 5, there is shown a schematic illustration of a wind turbine, generally designated by reference numeral 70 and having incorporated a flange arrangement 10 or 100 according to the present invention. For sake of simplicity, the following description refers, by way of example, only to flange arrangement 10 but the principles described in the following description with respect to the flange arrangement 10 are equally applicable to the flange arrangement 100.

The wind turbine 70 includes a rotor 63, which is rotatably attached to a nacelle 65. The rotor 63 is connected to a rotor shaft 62, which represents the power shaft of the flange arrangement 10 and is in driving relationship via gear unit 50 to a generator 64, which is used as an example of a machine 55 as referred to above. The rotor shaft 62, the gear unit 50 and the generator 64 form part of a drive train 60 of the wind turbine 70, which drive train 60 is accommodated in the nacelle 65. The gear unit 50 is connected in a torque-transmitting manner via the flanged hub 20 of the flange arrangement 10 to the rotor shaft 62. The gear unit 50 is further connected with a power shaft 12, which is embodied as a solid shaft and by means of which the torque-transmitting connection to the generator 64 is established. The power shaft 12, which leads to the generator 64, is coupled to the generator 64 via the flanged hub 20 of another flange arrangement 10. The power shaft 12 and the flanged hub 20 to couple the generator 64 to the gear unit 50 thus form part of the other flange arrangement 10.

Figure 6:
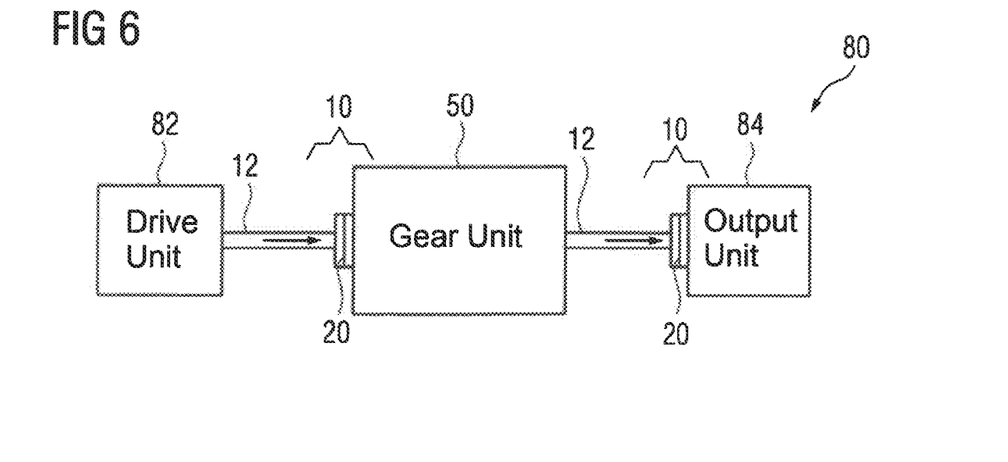
FIG. 6 is a schematic illustration of an industrial application having incorporated a flange arrangement according to the present invention.

FIG. 6 is a schematic illustration of an industrial application, generally designated by reference numeral 80 and having incorporated a flange arrangement 10 or 100 according to the present invention. For sake of simplicity, the following description refers again, by way of example, only to flange arrangement 10 but the principles described in the following description with respect to the flange arrangement 10 are equally applicable to the flange arrangement 100.

The industrial application 80 has a drive unit 82 and an output unit 84, which are connected to one another in a torque-transmitting manner by way of a gear unit 50. The drive unit 82 generates the drive power 25 to operate the output unit 84. The drive unit 82 is embodied as an electric motor. The output unit 84 is embodied as a mechanical application. The output unit 84 is accordingly embodied so that the industrial application 80 is, for instance, a mill, vertical mill, sugar mill, cement mill, rock breaker, conveyor belt, pump, roller press, slat conveyor, tube mill, rotary kiln, slewing gear, agitator, lifting apparatus, compactor or crusher. The gear unit 50 is connected to the drive unit 82 by way of a power shaft 12 and a flanged hub 20 of a flange arrangement 10 according to the present invention. In this regard, the power shaft 12 is an output shaft of the electric motor. The gear unit 50 is furthermore provided with a power shaft 12, by way of which the drive power is transmitted to the output unit 84. For this purpose, the power shaft 12 is coupled to a flanged hub 20, which, together with the power shaft 12, forms part of another flange arrangement 10 according to the present invention. Furthermore, the industrial application 80 according to FIG. 6 is provided with a flange arrangement 10 according to the present invention which is arranged on an exit side of the gear unit 50. As a result, the power shaft 12, which connects the gear unit 50 to the output unit 84, is connected to the gear unit 50.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A flange arrangement, comprising:
   a power shaft;
   a flanged hub connected detachably to the power shaft, wherein the flanged hub has an involute spline in mesh with an involute spline on the power shaft; and
   a stop member configured to hold the flanged hub on the power shaft, wherein the stop member can be rotated about a rotation axis of the power shaft such that in a disassembly position of the stop member, a support segment of the flanged hub opposes a support segment of the stop member to be able to exert a disassembly force on the flanged hub by means of the stop member, wherein at least one of: the support segment of the stop member extends radially outward and the support segment of the flanged hub extends radially inward.

2. The flange arrangement of claim 1, wherein the disassembly force exerted by the stop member is aligned along the rotation axis of the power shaft.

3. The flange arrangement of claim 1, wherein the stop member has a first front face in facing relation to the power shaft so as to exert a holding force on the flanged hub, and a second front face which faces away from the power shaft and exerts the disassembly force.

4. The flange arrangement of claim 3, wherein the stop member is configured for rotation between a holding position, in which the stop member exerts the holding force, and a disassembly position in which the stop member exerts the disassembly force.

5. The flange arrangement of claim 1, further comprising a fastener received in the stop member to exert the disassembly force onto the flanged hub.

6. The flange arrangement of claim 1, wherein the power shaft is embodied as a solid shaft or as a hollow shaft.

7. The flange arrangement of claim 1, wherein the flanged hub comprises:
   a cylinder section having the involute spline;
   a flange section adjoining the cylinder section; and
   a support collar configured to axially support the flanged hub on the power shaft as the involute spline of the cylinder section meshes the involute spline of the power shaft.

8. The flange arrangement of claim 1, wherein the-stop, member comprises:
   an annular body having a plurality of cut-outs; and
   fasteners received in the cut-outs and interacting with the power shaft.

9. A gear unit, comprising a flange arrangement, said flange arrangement comprising a power shaft embodied as a drive shaft or as an output shaft, a flanged hub connected detachably to the power shaft and comprising a cylinder section having an involute spline, a flange section adjoining the cylinder section, and a support collar configured to axially support the flanged hub on the power shaft as the involute spline of the cylinder section meshes an involute spline of the power shaft, and a stop member configured to hold the flanged hub on the power shaft wherein the stop member can be rotated about a rotation axis of the power shaft such that in a disassembly position of the stop member a support segment of the flanged hub opposes a support segment of the stop member to be able to exert a disassembly force on the flanged hub by means of the stop member, wherein at least one of: the support segment of the stop member extends radially outward and the support segment of the flanged hub extends radially inward.

10. An electric motor, comprising:
 a power shaft, the power shaft of the electric motor embodied as an output shaft; and
 a flange arrangement, said flange arrangement comprising the power shaft, a flanged hub connected detachably to the power shaft, wherein the flanged hub has an involute spline in mesh with an involute spline on the power shaft, and a stop member configured to hold the flanged hub on the power shaft, wherein the stop member can be rotated about a rotation axis of the power shaft such that in a disassembly position of the stop member a support segment of the flanged hub opposes a support segment of the stop member to be able to exert a disassembly force on the flanged hub by means of the stop member, wherein at least one of: the support segment of the stop member extends radially outward and the support segment of the flanged hub extends radially inward.

11. The electric motor of claim 10, wherein the flanged hub and the power shaft are connected via a taper seat, a cylindrical press fit, or a shaft-hub connection with key connection.

12. A drive train for a wind turbine, said drive train comprising:
 a generator;
 a gear unit connected as a first connection in a torque-transmitting manner to the generator; and
 a power shaft connected as a second connection in a torque-transmitting manner to the gear unit;
 wherein at least one of the first connection and the second connection is formed as a flange arrangement that includes: a flanged hub connected detachably to the power shaft, and a stop member configured to hold the flanged hub on the power shaft wherein the stop member can be rotated about a rotation axis of the power shaft such that, in disassembly position of the stop member, a support segment of the flanged hub opposes a support segment of the stop member to be able to exert a disassembly force on the flanged hub by means of the stop member, wherein at least one of: the support segment of the stop member extends radially outward and the support segment of the flanged hub extends radially inward.

13. A wind turbine, comprising:
 a nacelle;
 a rotor attached to the nacelle; and
 a drive train received in the nacelle and comprising a generator, a gear unit connected as a first connection in a torque-transmitting manner to a generator, a power shaft connected as a second connection in a torque-transmitting manner to the gear unit, wherein at least one of the first connection and the second connection is formed as a flange arrangement that includes: a flanged hub, connected detachably to the power shaft, and stop, member configured to hold the flanged hub on the power shaft wherein the stop member can be rotated about a rotation axis of the power shaft such that in a disassembly position of the stop member, a support segment of the flanged hub opposes a support segment of the stop member to be able to exert a disassembly force on the flanged hub the means of the stop member, wherein at least one of: the support segment of the stop member extends radially outward and the support segment of the flanged hub extends radially inward.

14. An industrial application, comprising:
 a drive unit;
 a gear unit;
 an output unit connected to the gear unit in a torque-transmitting manner; and
 a connection provided between the gear unit and at least one of the drive unit and the output unit, the connection including a flange arrangement, wherein the flange arrangement comprises a power shaft, a flanged hub connected detachably to the power shaft, and a stop member configured to hold the flanged hub on the power shaft, wherein the stop member can be rotated about a rotation axis of the power shaft such that in a disassembly position of the stop member, a support segment of the flanged hub opposes a support segment of the stop member to be able to exert a disassembly force on the flanged hub by means of the stop member, wherein at least one of: the support segment of the stop member extends radially outward and the support segment of the flanged hub extends radially inward.

* * * * *